United States Patent [19]
Lutz et al.

[11] Patent Number: 5,781,465
[45] Date of Patent: Jul. 14, 1998

[54] METHOD AND APPARATUS FOR FAST CARRY GENERATION DETECTION AND COMPARISON

[75] Inventors: David R. Lutz; D. N. Jayasimha, both of Columbus, Ohio

[73] Assignee: Lucent Technologies Inc., Murray Hill, N.J.

[21] Appl. No.: 577,952

[22] Filed: Dec. 22, 1995

[51] Int. Cl.$^6$ .................................................. G06F 7/02
[52] U.S. Cl. .............................. 364/769; 340/146.2
[58] Field of Search ................... 364/769; 340/146.2

[56] References Cited

U.S. PATENT DOCUMENTS 4,935,719  6/1990  McClure ............................ 364/769
5,281,946  1/1994  Le ................................. 340/146.2
5,495,434  2/1996  Taniguchi ......................... 364/769
5,592,142  1/1997  Adams et al. ..................... 340/146.2

OTHER PUBLICATIONS

"Binary Counter with Counting Period of One Half Adder Independent of Counter Size", Jun. 1989 IEEE, vol. 36, No. 6, pp. 924–926.

*Primary Examiner*—David H. Malzahn
*Attorney, Agent, or Firm*—Christopher N. Malvone

[57] ABSTRACT

Two binary two's complement numbers X and Y are compared using half-adders and a parallel prefix-and circuit to find a carry bit that results from forming the sum C+S, where C is the carry word and S is the sum word of the half-adder representation of X+Y. The carry bit is used to calculate the sign of C+S and the sign is used to determine whether X<Y, or X>Y. Additionally, the circuit also indicates when X=Y.

4 Claims, 3 Drawing Sheets

METHOD AND APPARATUS FOR FAST CARRY GENERATION DETECTION AND COMPARISON

BACKGROUND OF THE INVENTION

1. Field of the Invention

The present invention relates to computer arithmetic and more specifically, comparing n-bit two's complement numbers.

2. Description of the Related Art

The comparison of two binary numbers X and Y is an important problem in computer arithmetic. While it is easy to construct an optimal time circuit to determine whether or not X equals Y, it is difficult to build a circuit to determine whether X is less than Y or whether X is greater than Y. These more difficult comparisons appear in branch calculations, iterative division, square root algorithms, memory bounds checking and numerous other applications. The usual method to perform this type of comparison is to compute X−Y and examine its sign. This requires the delay of a carry propagate adder which has a delay of at least two $\log_2 n$ logic level delays, where n is the number of bits in each of the words being compared. These delays quickly add up because comparisons such as X<Y, or Y>X are used in frequently executed functions, such as in branch calculations.

SUMMARY OF THE INVENTION

An embodiment of the present invention provides a method for a fast comparison of two binary two's complement numbers X and Y. This embodiment of the invention uses half-adders and a parallel prefix-and circuit to find a carry bit that results from forming the sum C+S, where C is the carry word and S is the sum word of the half-adder representation of the sum of the lower order n−1 bits of X+$\overline{Y}$. The carry bit is used to calculate the sign of X+$\overline{Y}$ and the sign is used to determine whether X<Y, or X>Y. The comparison requires on the order of $\log_2 n$ logic level delays to form a comparison, where n is the number of bits in each of the words being compared. This method is approximately twice as fast as previous methods and thereby provides a doubling of speed in many common calculations used by computers.

DETAILED DESCRIPTION OF THE INVENTION

Figure 1:
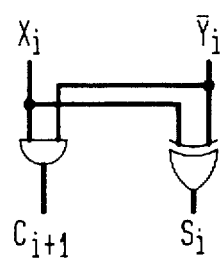
FIG. 1 illustrates a half-adder circuit.
Figure 5:
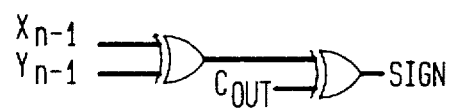
FIG. 5 illustrates an EXCLUSIVE-OR circuit.

With regards to notation, lower case letters are used to represent numbers and upper case are used to represent n-bit words. The subscripted lower case letters represent bits. The meaning of other symbols are given in Table 1. In addition, it should be noted that the lower order bit in a word is bit 0.

TABLE 1

| Symbol | Meaning |
|---|---|
| $\cap$ | bitwise and |
| $\cup$ | bitwise or |
| $\oplus$ | Bitwise exclusive-or |
| $\bar{x}_i$ | not $x_i$ |
| $\overline{X}$ | one's complement of X |

An n-bit half adder consists of n independent half adders. It takes two n-bit two's complement numbers as inputs, and produces two outputs: an n-bit sum and an n-bit carry. Let $X=x_{n-1} \ldots x_1, x_0$, and $Y=y_{n-1} \ldots y_1, y_0$ be n-bit words with low order bits $x_0$ and $y_0$. An n-bit half adder produces a carry word $C=c_{n-1} \ldots c_1, c_0$ and a sum word $S=s_{n-1} \ldots s_1, s_0$ such that $$c_i = x_{i-1} \cap y_{i-1} \tag{2}$$

$$s_i = x_i \oplus y_i$$

Note that $c_0$ is always 0, and that $$C+S=X+Y (\text{modulo } 2^n) \tag{2a}$$

The high order carry bit $c_n$ is not part of C, but is sometimes useful as part of a larger calculation.

(C,S) is in half-adder form (or h-a form) if there exist X and Y satisfying equation 2. We write (C,S)=ha(X,Y). When an n-bit word A is the prefix-and of S, it means that for each bit $a_i$ of A, $a_i=1$ if and only if $s_{n-1}=s_{n-2}=\ldots=s_i=1$.

In determining whether X>Y, X=Y, or X<Y, it is useful to note the following relationships.

$$X=Y \leftrightarrow X+\overline{Y}=-1 \tag{3}$$

$$\text{Also, } X>Y \leftrightarrow X+\overline{Y}>-1 \tag{4}$$

These relationships are evident from the very nature of two's complement numbers.

In order to examine two's complement numbers, it is useful to represent the numbers in half-adder form as defined above. A number in half-adder form is represented by the C or carry component and the S or sum component. With regard to the C and S components, it should be noted that $$C+S=-1 \leftrightarrow S=-1 \tag{5}$$

With regard to relationship 5, the definition of a two's complement number shows that $X+Y=-1 \leftrightarrow Y=\overline{X}$. Then according to equation 2, $S=X\oplus\overline{X}=-1$ As a result, S consists of all ones. A quick examination of equations 1 and 2 shows that only one of $c_i$ and $s_{i-1}$ can be set (=1) for i=1, ... n−1, as a result, when C+S=−1, C=0 and S=−1

In view of the above relationships, the two numbers X and Y may be compared by computing C and S which are the half-adder form of the sum of the low order n−1 bits of X and $\overline{Y}$. Once C and S are calculated, the sign-bit of X+$\overline{Y}$ can easily be computed using the carry out of C+S. The formula is given in (9). The sign bit of X+$\overline{Y}$ may be used to determine whether X=Y, X>Y, or X<Y.

$$\text{If the sign-bit of X+}\overline{Y} \text{ is 0, then X>Y} \tag{6}$$

(This is evident by recalling equation 2a and relationship 4.)

$$\text{If S=−1 and the sign bit of X+}\overline{Y} \text{ is 1, then X=Y} \tag{7}$$

(This relationship is evident from reviewing relationships 3 and 5.)

Otherwise, X<Y, i.e., the sign-bit of X+Ȳ is 1 and S is not equal to −1.  (8)

Relationships 6, 7, and 8 permit the comparison of the numbers X and Y by determining the sign-bit of C+S and determining whether S is =−1. The sign-bit of C+S is determined in accordance with the following formula.

$$SIGN = x_{n-1} \oplus y_{n-1} \oplus c_{out} \quad (9)$$

where $c_{out}$ is the carry out of C+S. A method to find this carry out is described as follows. To simplify our notation, we assume that the carry out problem is for an n-bit word; this would be appropriate if the original comparison involved n+1 bit words (i.e., if we started with n+1-bit X and Y).

FIG. 1 illustrates a half-adder circuit that may be used to produce sum bits and carry bits. The one's complement of Y may be produced using inverting buffers.

Figure 2:
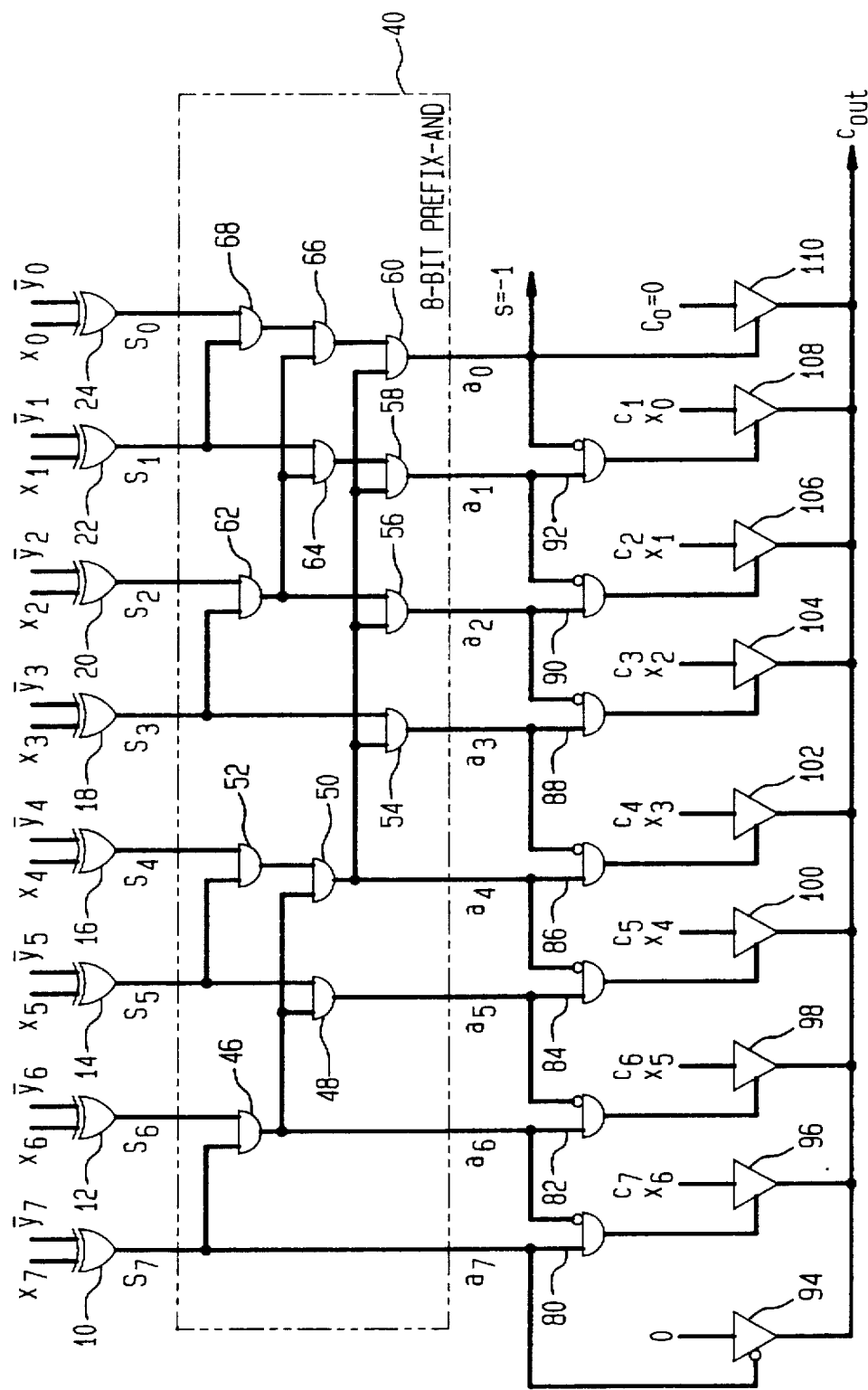
FIG. 2 illustrates a prefix-and circuit and a carry detection circuit.

FIG. 2 illustrates an 8 bit prefix-and carry generation detection circuit. The figure illustrates a circuit used for an 8 bit number or n=8; however, a similar circuit may be used for larger numbers of bits. Exclusive-or gates 10, 12, 14, 16, 18, 20, 22, and 24 are used to form the sum word S by exclusive-oring the individual bits of word X and word Ȳ. The output of the exclusive-or gates are then passed to 8-bit prefix-and circuit 40. The output of circuit 40 is an n-bit prefix-and word A having bits $a_7$ through $a_0$, or in the more general case, bits $a_{n-1}$ through $a_0$. The output of exclusive-or gate 10 is fed directly to output $a_7$ of circuit 40 and to the input of and gate 46. The output of exclusive-or gate 12 is passed to the second input of gate 46. The output of and gate 46 is fed to output $a_6$ of circuit 40, and to an input of and gate 48 and an input of and gate 50. The output of exclusive-or gate 14 is fed to a second input of and gate 48, and to an input of and gate 52. The output of and gate 48 is used as output $a_5$ of circuit 40. The output of exclusive-or gate 16 is fed to a second input and gate 52, and the output of and gate 52 is fed to a second input of and gate 50. The output of and gate 50 is output $a_4$ of circuit 40. The output of and gate 50 is also fed to an input of and gates 54, 56, 58 and 60. The output of exclusive-or gate 18 is fed to a second input of and gate 54 and to an input of and gate 62. The output of and gate 54 is output $a_3$ of circuit 40. The output of exclusive-or gate 20 is fed to the second input of and gate 62. The output of and gate 62 is fed to the second input of and gate 56 and to an input of and gates 64 and 66. The output of and gate 56 is output $a_2$ of circuit 40. The output of exclusive-or gate 22 is fed to the second input of and gate 64 and to an input of and gate 68. The output of and gate 64 is fed to a second input of and gate 58 which provides output $a_1$ of circuit 40. The output of exclusive-or gate 24 is fed to a second input and gate 68. The output of and gate 68 is fed to a second input of and gate 64 which is passed to a second input of and gate 60. The output of and gate 60 is output $a_0$ of circuit 40.

Outputs $a_7$ through $a_1$ of circuit 40 are fed to the non-inverting input of and gates 80, 82, 84, 86, 88, 90 and 92, respectively. Additionally, outputs $a_6$ through $a_0$ are fed to the inverting inputs of and gates 80, 82, 84, 86, 88, 90 and 92, respectively. Output $a_7$ of circuit 40 is also fed to the inverting enable input of tristate buffer 94. The output of and gates 80, 82, 84, 86, 88, 90 and 92 are fed to the non-inverting enable input of tristate buffers 96, 98, 100, 102, 104, 106 and 108, respectively. Output $a_0$ of circuit 40 is fed to the non-inverting enable input of tristate buffer 110. The outputs of tristate buffers 94 to 110 are connected to produce a carry output of the circuit of FIG. 1. The carry output is used to determine the sign of S+C in accordance with equation 9.

With regard to the output of circuit 40, i.e., bits $a_7$–$a_0$. A may equal 0, −1, or some other value. If A=0, the carry bit produced by C+S is 0. If A=−1, the low order n bits of X equal the low order n bits of Y, and if A is neither 0 or −1 then for some i, $a_i$=1 and $a_{i-1}$=0. Then $c_i$ is equal to the carry bit produced by C+S.

When A=0, the carry out bit produced by C+S is 0. This can be seen by noting that if A=0, $a_7$=0 which means that bit $s_7$ (or $s_{n-1}$) equals 0. The carry bit added to bit $s_{n-1}$ to form C+S is bit $c_{n-1}$ which may be 0 or 1. If bit $c_{n-1}$ is 0, the sum C+S will result in a carryout bit ($c_{out}$) of 0, if on the other hand bit $c_{n-1}$ is =1, equation 2 requires that bit $s_6$ (or $s_{n-2}$) must be 0 and as a result there is no carry into bit position n−1 when summing bits $s_{n-2}$ and $c_{n-2}$. If there is no carry bit into position n−1 the sum of $s_{n-1}$=0 and $c_{n-1}$=1 produces a carryout of 0. Therefore, if A=0 (which means bit $s_{n-1}$=0) the carryout bit produced by the sum of C+S is 0.

If A=−1 (i.e., bits $a_{n-1}$ through $a_0$ all equal 1), an examination of circuit 40 shows that bits $s_{n-1}$ through $s_0$ must all equal 1. Therefore, if A=−1, S=−1. From relationship 7 it can be seen that when S=−1, X=Y and C=0. If C equals 0, the sum of C+S will produce a carryout of 0. It should be noted that by detecting that bit $a_0$=1, it can be determined that S=−1 or that the low order n bits of X equal the low order n bits of Y.

It should be noted with regard to the circuit of FIG. 2, that if A is not equal to 0 or −1, that $c_i$ is the carryout bit produced by the circuit of FIG. 2. The carry bit $c_i$ is the bit buffered by the tristate buffer that is enabled by bit $a_i$ where bit $a_i$ is the lowest order bit of A that is equal to 1 such that $a_{i-1}$=1 if and only if $s_{n-1}$=$s_{n-2}$=...=$s_i$=1. With regard to the above discussion, it should be noted that an examination of equations 2 show that only one of $s_i$ and $c_i$+1 can be set or equal to 1 at any time. Therefore, since $s_{n-1}$=$s_{n-2}$=...$s_i$=1, $c_{i+1}$...$c_n$=$c_{n-1}$=0 and no carry is generated in positions i+1, i+2, ..., n−1 when the sum C+S is formed. Also note that $s_{i-1}$ is =0 and therefore there is no carry into position i. As a result, the carryout produced by the sum C+S is bit $c_i$ which is available at the output of one of the tristate buffers.

With regard to determining the carryout produced by the sum C+S, the above can be summarized as follows 1. Compute the prefix-and A ($a_{n-1}$ ... $a_0$)
2. Do the following in parallel
   o if $a_{n-1}$=0 then return 0 ($c_{out}$=0)
   o if $a_0$=1 then return 0 ($c_{out}$=0 & the low order n bits of X equal the low order n bits of Y.)
   o for i=1, 2, ..., n−1 do in parallel, if $a_i \cap \bar{a}_{i-1}$=1 then return $c_i$ ($c_{out}$=$c_i$)

The carry bit $c_{out}$ produced by the output of the circuit of FIG. 1, is used with the equation 9 to determine the sign of X+Ȳ.

It should be noted that the inputs to tristate buffers 94−110 are shown to be carrybits $c_7$ through $c_0$. ($c_{in}$ is set equal to 0) It should be noted that the carrybits can be replaced with the corresponding bits of either word X or Ȳ. This can be illustrated by considering the following. Recall that bit i is the bit such that $a_i \cap \bar{a}_{i-1}$ is equal to 1, therefore $s_{i-1}$ is equal to 0. If the $s_{i-1}$=0, the inputs to the half-adder at position i−1 are equal (recall the exclusive-or gates). As a result, the value of $c_i$ can be determined by using either of the original inputs to the exclusive-or gates.

The prefix-and circuit previously discussed is cumbersome for large n. Another embodiment of the invention uses the prefix-and method and some aspects of carry-lookahead addition, to determine the sign of the sum produced by C+S. Carry-lookahead adders calculate whether or not a group of bits generates a carry based on carry propagate and generate signals defined as follows:

$$p_{i,i} = x_i \oplus y_i$$

$$g_{i,i} = x_i \cap y_i$$

$$p_{i,k} = p_{i,j} \cap p_{j+1,k}$$

$$g_{i,k} = g_{j+1,k} \cup (p_{j+1,k} \cap g_{i,j})$$

The propagate bit $p_{i,k}$ indicates that a carry into bit i will propagate through bit k, and the generate bit $g_{i,k}$ indicates that a carry is generated by the sum of the bits in positions i through k. Most discussions of carry-lookahead addition define $p_{i,i}$ as $x_i \cup y_i$. This is technically incorrect because if $x_i = y_i = 1$, then a carry is not propagated through position i; however, a carry is generated at position i, and it is easy to see that this simplification makes no difference in any result $g_{i,k}$. Since the $g_{i,k}$ are the only results that matter in carry-lookahead addition, and since OR is usually easier to implement than XOR, the incorrect definition is more popular than the correct definition. We prefer the correct definition, $p_{i,i} = x_i \oplus y_i$, because we need the true values of $p_{i,k}$ and because we want to use the properties of half-adder form. Note that if carry word C and sum word S are the half-adder from of words X and Y, and if A is the prefix-and of S, then $$p_{i,i} = s_i$$

$$p_{i,i-1} = a_i$$

$$g_{i,i} = c_{i+1}$$

If $p_{i,k}$ is set, and if the sum of the words consisting of the low order i bits of C and S generates a carry, then it will propagate from bit i to bit k.

If $g_{i,k}$ is set, then when C and S are added, there is a carry-out of bit k.

Figure 3:
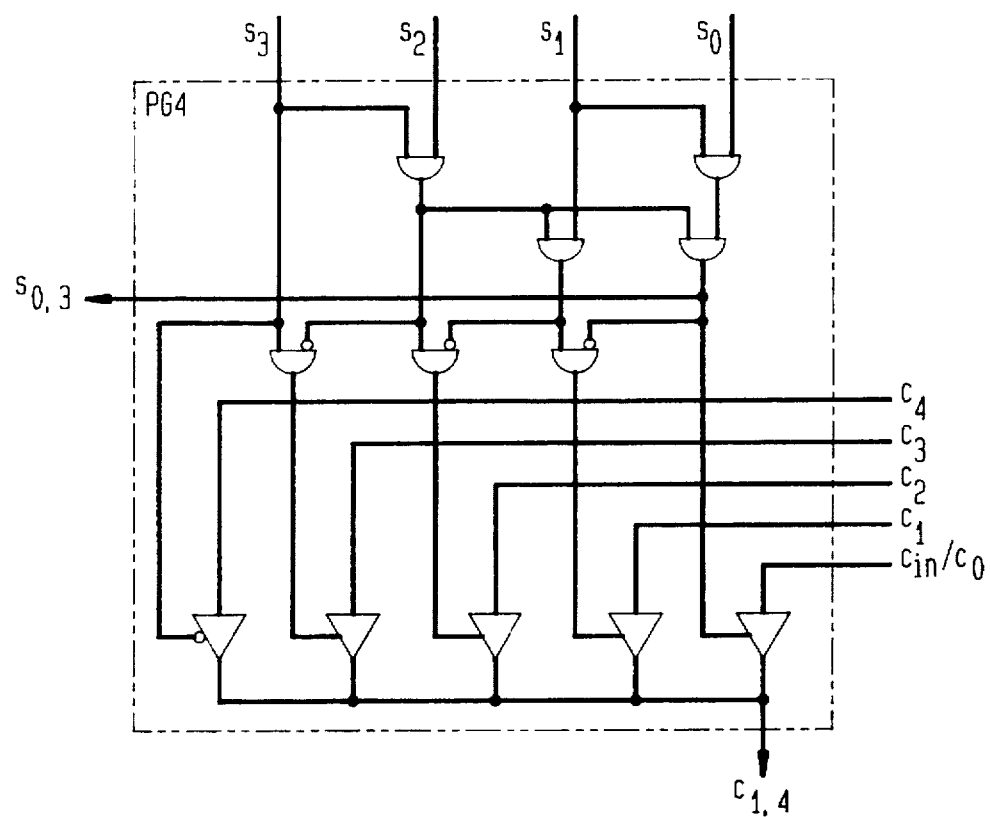
FIG. 3 illustrates a 4-bit prefix-and propagate-generate circuit (PG4)
Figure 4:
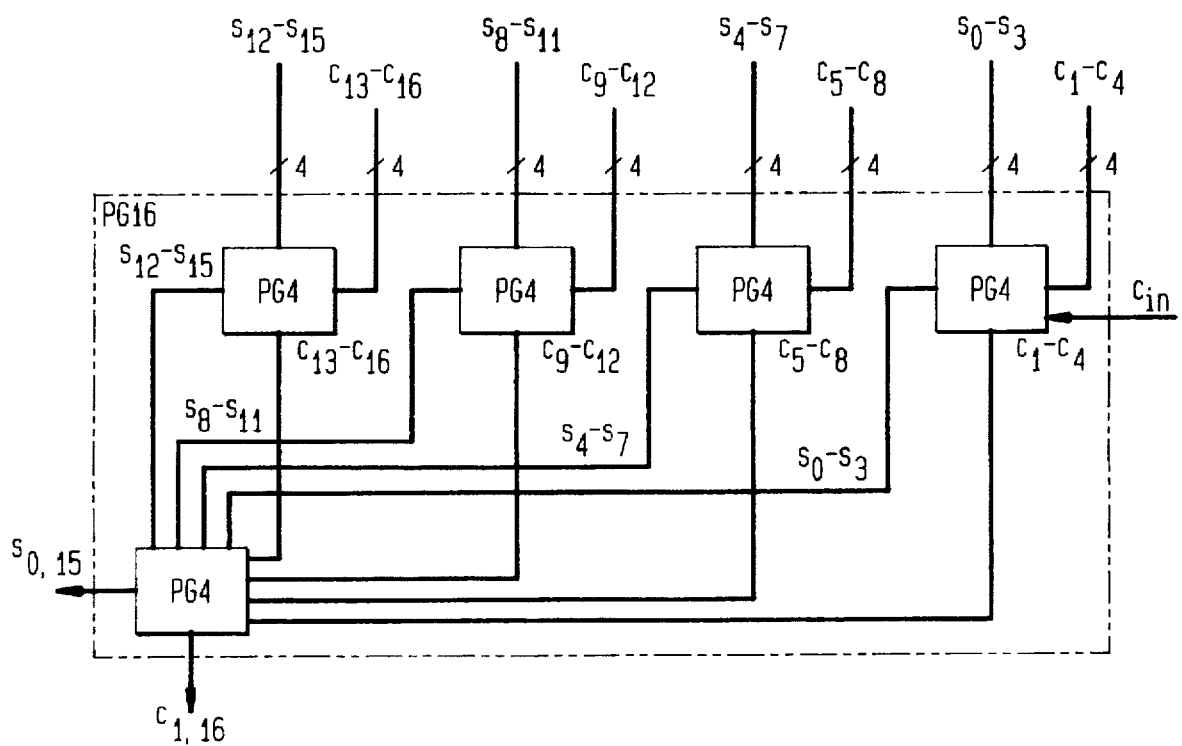
FIG. 4 illustrates a 16-bit circuit using 4-bit PG4 circuits.

The prefix-and method can be applied recursively, by splitting an n-bit problem into (typically) 4 to 8-bit blocks, and computing the propagate and generate signals from each block. As an example, FIG. 4 shows a 16-bit circuit composed of 4-bit prefix-and propagate-generate (PG4) blocks. The PG4 blocks are shown in FIG. 3.

Replacing the first stage PG4 modules in FIG. 4 with PG16 modules produces module PG64. In general, a $4^k$-bit propagate and generate unit can be constructed out of k stages of PG4 modules, and it will produce its generate output in $\log_2(4^k)+2=2k+2$ logic levels. We refer to this method as the partial prefix-and method because only part of the prefix-and is computed. It has the same delay as the prefix-and method, but is easier to lay out and requires fewer gates.

The invention claimed is:

1. An apparatus for comparing a first n bit two's complement binary number $x_{n-1}, x_{n-2}, \ldots, x_0$ and a second n bit two's complement binary number $y_{n-1}, y_{n-2}, \ldots, y_0$, comprising:

means for forming a sum word S by performing a bit wise EXCLUSIVE-OR of the first number and a one's complement of the second number, the sum word S having a plurality of bits in the form $s_{n-1}, s_{n-2}, \ldots, s_0$, where $s_0$ is a lowest order s bit;

means for determining a value i corresponding to a lowest order consecutive set bit $s_i$;

means for selecting a carry bit $c_i$, where $c_i$ is defined by:
$c_i = 0$ when $i = 0$
$c_i = 0$ when $s_{n-1} = 0$, and when $i \neq 0$ and $s_{n-1} \neq 0$, $c_i$ is defined by least one of
 a) $c_i = x_{i-1}$
 b) $c_i = \bar{y}_{i-1}$
 c) $c_i = x_{i-1} \cap \bar{y}_{i-1}$; and means for EXCLUSIVE-ORING $x_{n-1}, y_{n-1}$ and $c_i$ to produce a sign bit, the first and second numbers being equal when $i = 0$, the first number being greater than the second number when the sign bit = 1 and $i \neq 0$, and the first number being less than the second number when the sign bit = 0 and $i \neq 0$.

2. The apparatus of claim 1, wherein the means for forming a sum word S comprises a plurality of EXCLUSIVE-OR gates.

3. The apparatus of claim 1, wherein the means for determining a value i comprises a plurality of AND gates that logically AND bits of the sum word S to produce a word A having bits $a_{n-1}, a_{n-2}, \ldots, a_{n-1} = s_{n-1}$, and each bit $a_{n-2}, \ldots, a_0$ is formed by ANDING a number of adjacent bits of the sum word beginning with bit $s_{n-1}$ where the number of adjacent bits is two for bit $a_{n-2}$ and the number of adjacent bits increases by one for each decrease of one in an order of the A word bit.

4. The apparatus of claim 3, wherein the means for selecting a carry bit comprises a plurality of AND gates, where each AND gate ANDS adjacent pairs of bits $a_{n-1}, a_{n-2}, \ldots, a_0$ such that a higher order bit of pair is ANDED with an inverse of a lower order bit of the pair.

* * * * *